(12) United States Patent
Barthel et al.

(10) Patent No.: US 12,146,595 B2
(45) Date of Patent: Nov. 19, 2024

(54) COUPLING CONNECTOR WITH AUTOMATICALLY ACTIVATED RETAINER

(71) Applicant: TI Automotive (Fuldabrück) GmbH, Fuldabrück (DE)

(72) Inventors: Iris Barthel, Schauenburg (DE); Kay Bube, Schenklengsfeld (DE); André Häckel, Waldeck (DE); Reiner Rohde, Malsfeld (DE)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 0 days.

(21) Appl. No.: 18/116,206

(22) Filed: Mar. 1, 2023

(65) Prior Publication Data

US 2023/0279979 A1 Sep. 7, 2023

(30) Foreign Application Priority Data

Mar. 4, 2022 (EP) .................................. 22160137

(51) Int. Cl.
*F16L 37/098* (2006.01)
*F16L 37/084* (2006.01)
*F16L 37/088* (2006.01)
*F16L 37/12* (2006.01)
*F16L 37/14* (2006.01)

(52) U.S. Cl.
CPC ....... *F16L 37/0982* (2013.01); *F16L 37/0885* (2019.08); *F16L 37/084* (2013.01); *F16L 37/1225* (2013.01); *F16L 37/144* (2013.01); *F16L 2201/10* (2013.01)

(58) Field of Classification Search
CPC .............. F16L 37/1225; F16L 37/0885; F16L 37/0841; F16L 37/084; F16L 37/144; F16L 2201/10
See application file for complete search history.

(56) References Cited

U.S. PATENT DOCUMENTS 7,497,480 B2* 3/2009 Kerin ................. F16L 37/0885
2003/0178844 A1* 9/2003 Klinger ................ F16L 37/144
(Continued)

FOREIGN PATENT DOCUMENTS

| CN | 209385877 U | 9/2019 |
|---|---|---|
| EP | 2541118 A1 | 1/2013 |
| JP | 2005069461 A | 3/2005 |

OTHER PUBLICATIONS

Search Report dated Aug. 4, 2022.
English translation of Japanese Office Action for JP2023-031629 dated Apr. 1, 2024.

*Primary Examiner* — William S. Choi
(74) *Attorney, Agent, or Firm* — Dickinson Wright PLLC

(57) ABSTRACT

A coupling connector has a coupling body as well as a plug lock. The plug lock comprises a retainer and a verifier, wherein the plug lock can be inserted into the coupling body in a radial direction. The verifier has two legs and a back, wherein the ends of the legs facing away from the back are allocated to a bottom of the coupling body. If a coupling plug is inserted into the coupling connector, the plug lock is automatically transferred from a disengaged position into an engaged position. The coupling connector is designed in such a way that bottom-side ends of the legs retain their distance to each other while being deflected by the coupling plug.

20 Claims, 9 Drawing Sheets

(56) References Cited

U.S. PATENT DOCUMENTS

| | | | |
|---|---|---|---|
| 2005/0063125 A1 | 3/2005 | Kato | |
| 2009/0261582 A1* | 10/2009 | Gaudin | F16L 37/0841 |
| 2014/0312614 A1* | 10/2014 | Barthel | F16L 37/0885 |
| 2016/0040813 A1* | 2/2016 | Hatanaka | F16L 37/0885 |
| 2019/0234547 A1* | 8/2019 | Gauthier | |
| 2022/0243850 A1* | 8/2022 | Teasley | F16L 37/1225 |

* cited by examiner

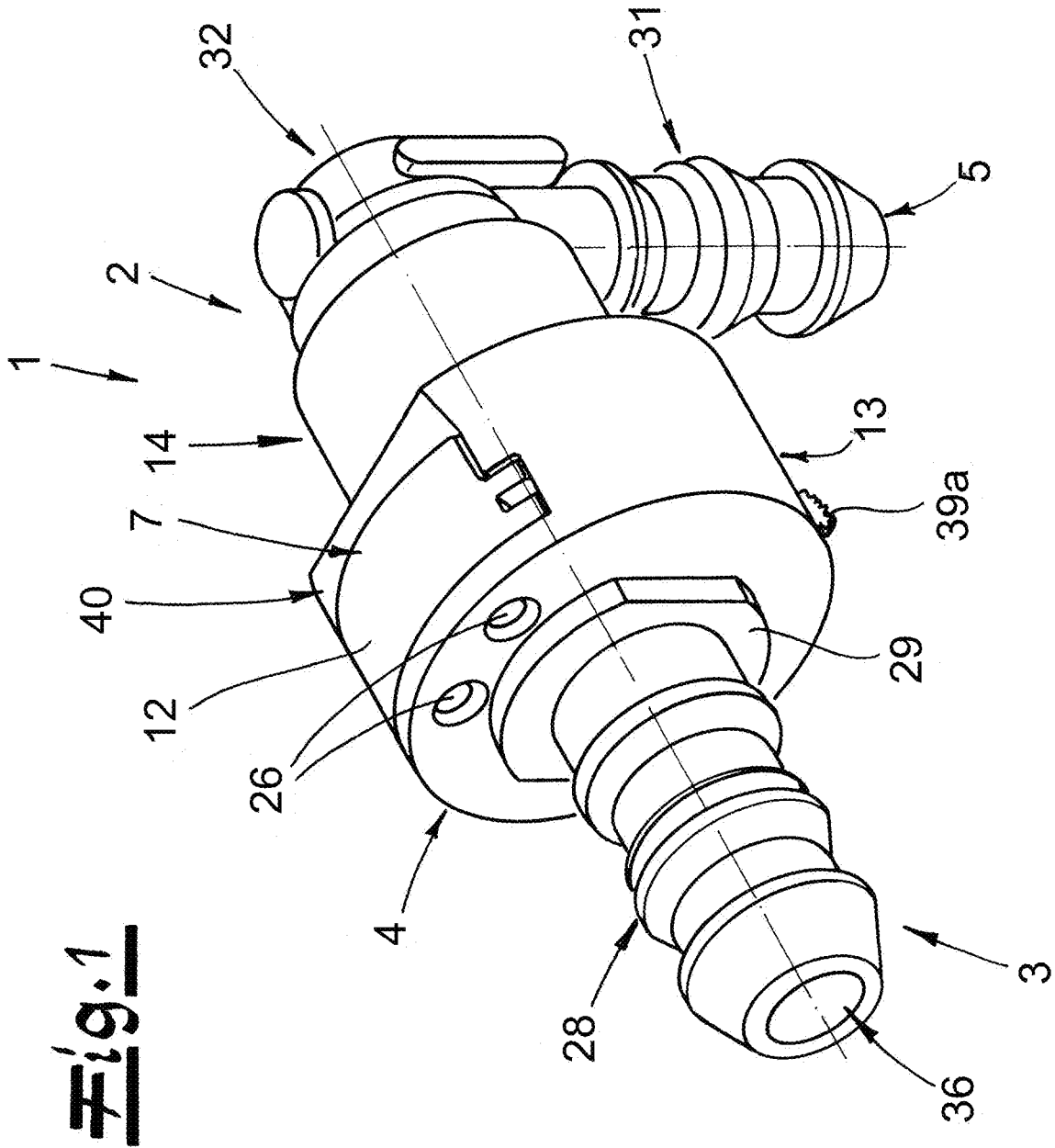

D-D

A-A

B-B

COUPLING CONNECTOR WITH AUTOMATICALLY ACTIVATED RETAINER

RELATED APPLICATIONS

The present disclosure claims priority to and the benefit of European Application 22160137.0, filed on Mar. 4, 2022, the entire contents of each of which are incorporated herein by reference.

FIELD

The disclosure relates to a coupling connector for tubes, pipes and/or coupling plugs, preferably for use in a fluid system of a land vehicle.

BACKGROUND

One coupling connector is known from U.S. Pat. No. 10,808,872 B2. The verifier of the plug lock is connected as one piece and integrally with the retainer, and is roughly U-shaped in design like the retainer. The U-back of the verifier terminates flush with the coupling body, and transitions into a U-base or a back of the retainer. The verifier also comprises two legs, which are each connected with the back of the verifier, and can be spread apart from each other in a radial direction by a circumferential collar of the coupling plug. In the disengaged position of the plug lock and prior to insertion of the coupling plug, the ends of the legs that are not splayed, and are thus relaxed, strikes against a respective projection of the coupling body. The two projections are arranged inside of the coupling body, and ensure that the plug lock cannot be further inserted into the coupling body by pressing on the back. As a result, the user is provided with part of the automatic retraction or automatic activation function. This is because above all a defined, disengaged position enables an automatic retraction of the plug lock during insertion of the coupling plug.

While inserting the coupling plug into the coupling body according to U.S. Pat. No. 10,808,872 B2, the coupling plug or its circumferential collar initially elastically deflects the verifier legs axially inward, until they inwardly strike against the coupling body. Continuing to insert the coupling plug spreads the legs radially apart, so that the U-legs no longer strike against the projections. A reset energy stored in the legs is then released, as a result of which the ends of the legs each glide along a ramp of the coupling body. Since the two ramps taper diagonally to each other in the cross section and insertion direction of the plug lock, the plug lock is further pulled radially inward into the coupling body until the engaged position has been reached. The retainer now engages behind the circumferential collar of the coupling plug, so that the coupling plug is secured against being pulled out of the coupling body. As a result, the only remaining task for a user of this fluid coupling is to insert the coupling plug into the coupling connector, thereby further decreasing the installation effort. For example, this is more advantageous in cases where the installation space is so limited that the fitter cannot grasp the coupling connector with their hand, so as to manually push in the plug lock.

In one disadvantage, however, it was discovered that the indication function was no longer given after some time and in some instances for various designs of various manufacturers, because the plug lock could also be pushed into the coupling body even without a coupling plug. Also noticed was the defect that the plug lock was only retracted into the coupling body to an insufficient extent after some time and in some instances.

BRIEF SUMMARY

Therefore, the present disclosure provides a coupling connector that upgrades the functionality of the verifier or the plug lock, and thus offers a longer service life for the verifier or the plug lock. Additionally known from practice are fluid couplings or coupling connectors in which the plug lock can only be transferred into the retracted position with difficulty, for example with the levering use of a screwdriver. Therefore, the disclosure is provides an especially user-friendly mechanism for releasing the fluid coupling.

The foregoing is achieved by a quick coupling according to claim 1.

The disclosure is initially based upon the discovery that the disadvantages mentioned at the outset can be attributed to an instability of the legs of the verifier. This is because the latter have to be at least sectionally relatively thin due to the spreading capability. At the same time, the legs must rest precisely on the projections in the disengaged position, so that the indication function remains assured. The disadvantage mentioned at the outset was found to be caused by improper handling during assembly and maintenance and/or a material deterioration that arises with increasing service life. Both can negatively impact the spring elasticity of the U-legs, so that a premature insertion is possible and/or the plug lock is only insufficiently retracted into the coupling body.

The disclosure is further based upon the discovery that the verifier or the retraction mechanism of the coupling connector can be decisively stabilized by ensuring that the legs retain their distance from each other while being axially deflected by a coupling plug, and in particular are not spread apart. The spreading capability inherently yields relatively movable legs, so that in particular the spring elastic bearing position, as a rule the transition from the leg to the back, forms a weak point. The latter may still have enough spring elasticity at first, but after some time the elasticity tends to diminish. This becomes critical in particular when a load is placed on the spring elastic bearing position, for example when maintenance work is performed and the fluid coupling is separated and then reassembled. By avoiding the radial deflection or spreading of the legs, the coupling connector or the plug lock is significantly upgraded, as a result of which the object mentioned at the outset is achieved.

The term "partially automatic" preferably refers to the automatic retraction of the plug lock or the retainer from the disengaged into the engaged position if the coupling plug has preferably completely and expediently been manually introduced into the coupling connector. The expression "detachably" advantageously refers to the connection being released in a reversible, and hence nondestructive, manner.

The plug lock can be designed as a single piece, so that the retainer and the verifier can only be separated from each other in a destructive manner. The plug lock is advantageously integral in design, and can in particular be manufactured through injection molding. It is possible for the plug lock to have a multipart design, so that the retainer and the verifier are separate parts preferably each manufactured through injection molding. According to an embodiment, the verifier and the retainer can be assembled into a multipart plug lock via positive locking. It is possible that the retainer and the verifier can be inserted into the coupling body from different directions. The retainer and the verifier can preferably be inserted into the coupling body from the same direction.

The coupling body expediently comprises a first body end and a second body end. The first body end is or must preferably be allocated to a coupling plug. The plug section of the coupling body is preferably bordered by the first body end. A tip of a coupling plug advantageously defines the axial expansion of the plug section in an axial direction. The coupling body advantageously comprises a connecting section for connecting a pipe or an aggregate. In the case of an aggregate, a pump, a tank, a nozzle, or the like can be involved, for example. The coupling body expediently comprises a fluid channel, which connects the plug section with the connecting section. It is possible for the coupling body to have a transition section, wherein the transition section preferably is arranged between the plug section and the connecting section. The connecting section can be designed for reversible or irreversible connection with a pipe or an aggregate. In the case of the reversible connection with a pipe, the connecting section can have circumferential grooves for generating a press fit. It is preferred that the connecting section be connected or connectable with the pipe or the aggregate by means of welding, in particular by means of laser welding. It is possible that the connecting section comprise a receptacle for introducing a pipe or a section of an aggregate. According to an embodiment, it is possible that the coupling body or the connecting section transition into the aggregate as one piece or integrally.

It is preferred that the coupling body be manufactured as a separate part, in particular as an injection molded part. The coupling body can be designed as one piece or integrally. It is possible that the coupling have a multipart design. According to a preferred embodiment, the coupling body comprises two or more parts connected with each other by means of a latching connection. The coupling body can have a straight or angled design. In the case of a coupling body with a straight design, the middle axis of the plug section runs parallel, and preferably concentric with a middle axis of the connecting section. If the coupling body is angled in design, the middle axis of the plug section runs angled to a middle axis of the connecting section in a longitudinal section of the coupling body. The middle axis of the plug section defines an axial, a radial and a circumferential direction of the plug section. A radial direction can have two directional components in a front view of the first body end or in a cross section of the coupling body. An insertion direction of the plug lock in the coupling body can be understood as a first direction or radial directional component. A direction or directional component referred to as a transverse direction can run perpendicular to the insertion direction and perpendicular to the axial direction of the plug section. The middle axis of the connecting section can define an axial, a radial and a circumferential direction of the connecting section.

The coupling body preferably comprises a second body end. The second body end advantageously defines an end of the connecting section. The connecting section is expediently defined by an overlap of the coupling body and the pipe or the aggregate. The fluid channel advantageously connects the first body end or the plug section with the second body end or with the connecting section. The expression "axially inward" preferably refers to the axial direction of the plug section proceeding from the first body end further into the coupling body. The term "axially inward" preferably also refers to the axial direction proceeding from the plug section or transition section toward the second body end, because the pipe or the aggregate define an interior, and not the coupling body.

The coupling plug preferably comprises a locking element, which preferably interacts with the retainer of the coupling connector for locking the coupling plug in the coupling connector. The coupling plug advantageously comprises a coupling section for insertion into the coupling connector. The coupling section preferably corresponds to that section of the coupling plug which is located inside of the coupling connector in the completely inserted state of the coupling plug in the coupling connector. The coupling section preferably has a longitudinal axis, wherein the longitudinal axis of the coupling section preferably is aligned parallel, and especially preferably concentric to the middle axis of the plug section of the coupling body. The longitudinal axis of the coupling section defines an axial, a radial and a circumferential direction of the coupling section of the coupling plug.

According to a preferred embodiment, the coupling plug comprises a terminal section to be hooked up to a pipe or an aggregate. The terminal section can have the same analogous features as the connecting section of the coupling body. In particular, the terminal section can be designed to be hooked up to the pipe or the aggregate or already be hooked up. The coupling section and the terminal section of the coupling plug are expediently fluidically connected with each other via a flow channel of the coupling plug. The coupling plug can be straight or angled in design. The expression "axially inward" in relation to the coupling plug refers to the direction from the coupling section toward the terminal section of the coupling plug.

It is possible that the coupling plug have a flange, wherein the flange preferably strikes against the first body end of the coupling body in the completely inserted state of the coupling plug. The locking element preferably protrudes radially outward in relation to an exterior side of the coupling section. The locking element is preferably designed like an at least partially, and especially preferably as a completely circumferential collar. The locking element is advantageously arranged in the coupling section of the coupling plug. According to an embodiment, the locking element can be designed as an at least partially circumferential groove, and preferably as a completely circumferential groove. The locking element preferably divides the coupling section of the coupling plug into an intermediate section and into a sealing section. The intermediate section is advantageously arranged between the locking element and the terminal section. The sealing section is located between the locking element and a connector-side end of the coupling plug in an axial direction.

It is preferred that the back of the plug lock be located closer to the middle axis of the plug section in the engaged position than in the disengaged position. The back of the plug lock can be allocated to a cover of the coupling body. The ends of the legs of the verifier facing away from the back are preferably allocated to the bottom of the coupling body, and can in particular be referred to as bottom-side ends of the legs. In a longitudinal section of the coupling connector, it is preferred that the verifier or the legs be movable at least sectionally in an axial direction and preferably not in the transverse direction inside of the coupling body in the disengaged position of the plug lock. The bottom-side ends of the legs preferably retain the same distance from each other for the entire duration of deflection by the coupling plug.

According to a very preferred embodiment, the coupling connector or the coupling body or the legs or the verifier is/are designed in such a way that the legs cannot be deflected in a transverse direction by the coupling plug in the coupling body in a cross section in the disengaged position. According to an embodiment, the coupling body or the legs or the verifier is/are designed in such a way as to prevent the legs from being spread apart at least temporarily during the insertion of the coupling plug, and preferably completely during the insertion of the coupling plug.

It is very especially advantageous that the verifier comprise a connecting web, wherein the connecting web is arranged opposite the back in relation to the middle axis of the plug section during the disengaged and/or engaged position, and connects the legs with each other. This yields an especially compact or robust structure of the verifier, which simultaneously is not all too massive, and thus deformation-unfriendly. As a result, the objective of ensuring a strong, automatic retraction of the plug lock is achieved, while at the same time having to apply a relatively small force to the coupling plug during insertion into the coupling connector. Consequently, this produces a latching device that functions in an especially strong and reliable manner over a long period of time. The back of the plug lock or the verifier and the legs together expediently form a plug opening, through which the coupling plug protrudes in an axial direction in the completely inserted state. The connecting web together with the legs and the back preferably form a completely circumferential edge of the plug opening.

According to a very preferred embodiment, the coupling connector is designed in such a way that the plug lock can be transferred from the engaged into the disengaged position when actuating a bottom-side section of the verifier in an axial, preferably axially inward direction. This makes it especially easy to actuate the plug lock for releasing the latter, and achieves the object mentioned at the outset of providing a user-friendly mechanism for releasing the fluid coupling. The coupling connector is preferably designed in such a way that the coupling plug is pushed from the completely inserted position into an only partially inserted position during the transfer of the plug lock from the engaged into the disengaged position. This makes it obvious to the user that the locking process has ended.

According to a very preferred embodiment, a bottom-side end of the plug lock or of the verifier comprises at least one actuating element, and preferably two actuating elements, for transferring the plug lock from the engaged position into the disengaged position. The at least one actuating element preferably forms an end of one of the two verifier legs, wherein a respective actuating element preferably forms the end of one of the respective two legs. It is very preferred that the at least one actuating element have a rough or fluted structure for purposes of better handling. It is especially preferable that the coupling connector be designed in such a way or that the at least one actuating element be arranged in such a way in the engaged position of the plug lock that it can be reached with the bare hand, and actuated preferably in an axial direction, especially preferably in an axially inward direction.

It is very preferred that the legs of the verifier be angled, and preferably bent, axially outward in a side view and following the insertion direction of the plug lock. This yields an especially powerful retraction mechanism, and advantageously gives the plug lock a relatively compact design in a side view in an axial direction.

The coupling body advantageously has at least one projection that extends axially inward, and preferably two projections that extend axially inward, wherein the at least one projection preferably protrudes through the verifier or through one of the legs or the bottom-side end of the verifier at least partially in an axial direction in a side view in the engaged position of the plug lock. The projection together with a receptacle of the verifier preferably define the engaged position of the plug lock. It is preferred that the at least one projection be arranged on a front wall of the first body end. The at least one projection is expediently located in the area of the bottom of the coupling body. A projection of the coupling body is advantageously allocated to each of the two legs. in a side view, the at least one projection especially preferably protrudes completely through the verifier or through at least one of the legs in an axial direction in the engaged position of the plug lock. In a side view, the at least one projection advantageously tapers in an axially inward direction. The projection advantageously comprises a latching shoulder for latching with the verifier or with one of the two legs.

It is very preferred that the plug lock or the verifier comprise at least one receptacle and preferably two receptacles in a front view, wherein the at least one receptacle is advantageously designed to be latched with an element of the coupling body, preferably with the at least one projection. The at least one receptacle is expediently allocated to one of the two legs. The at least one receptacle is advantageously arranged in a bottom-side half or a bottom-side third of the verifier. The verifier preferably comprises at least one terminal element, and preferably two terminal elements. A bottom-side end of the at least one receptacle is advantageously formed by a terminal element, which prevents the plug lock from being inadvertently pulled out of the coupling body. In a side view, the terminal element advantageously tapers in an axially outward direction. Because the projection tapers in an axially inward direction and the terminal element in an axially outward direction, the axial deflection of the verifier or the leg can be converted into a radial retraction direction. It is especially preferred that the at least one projection have a retraction ramp on its radial exterior side in a side view. The retraction ramp is preferably designed in such a way that the verifier or the leg or the terminal element can glide along the retraction ramp in a side view, so that an axial tensioning of the verifier is converted into a radially inward or outward motion.

It is very especially preferred that the bottom of the coupling body have at least one bottom opening and preferably two bottom openings. The coupling connector or the coupling body or the verifier is advantageously designed in such a way that the legs glide at least sectionally through the at least one bottom opening in a side view during the transition from the disengaged to the engaged position. The at least one bottom opening is preferably defined by the fact that an imagined line is drawn in an axially inward direction in the side view, proceeding from an axially inward tip of the at least one projection. In a side view, the at least one bottom opening is expediently arranged axially inward from the at least one projection. The verifier preferably protrudes through the bottom opening only temporarily during the transition from the disengaged into the engaged position. The bottom opening makes it possible for the user to actuate the verifier or the actuating elements so as to transfer the plug lock from the engaged into the disengaged position.

In a side view or in a longitudinal view, a section of the verifier or the leg is preferably located in a radial direction between the bottom or the at least one projection and the retainer or a holding section of the retainer in the disengaged position. This yields a compact structure for the coupling connector. The retainer or the holding section and a bottom-side end of the verifier or the legs or the terminal elements preferably overlap each other in an axial direction. It is very preferred that at least one back-side section of the verifier or the leg be arranged axially inward relative to the retainer or the holding section in a longitudinal section. In a longitudinal section or in a side view, it is especially preferable that a receiving space for receiving the locking element of the coupling plug be arranged between the retainer and the verifier in a back-side section of the plug lock.

According to a very preferred embodiment, the verifier has a contact surface for contacting the coupling plug directly or indirectly, and preferably directly. The coupling connector or the plug lock or the verifier is preferably designed in such a way that the contact surface is arranged opposite the back of the verifier while the plug lock is in a disengaged position in relation to the middle axis of the plug section. As a result, the axial deflection by the locking element of the coupling plug exerts a force on the plug lock in the direction of the bottom, thereby generating the transition from the disengaged into the engaged position, in particular at the transition point.

A transition point in the transitional movement by the plug lock from the disengaged position into the engaged position is preferably defined by the fact that an axially inward end of the at least one projection comes into contact with an axially outward end of the bottom-side section of the verifier or the at least one terminal element. For example, the contact surface can be formed by one, two or several contact ramps of the verifier. It is preferred that the coupling connector be designed in such a way that the coupling plug come into contact with the contact surface of the verifier or with the at least one contact ramp with its locking element, preferably with an at least partially circumferential collar, during an insertion into the coupling connector. The contact surface is advantageously designed in such a way that the verifier is initially deflected axially inward during insertion of the coupling plug into the coupling connector, and exerts a force on the plug lock toward the bottom of the coupling body at the end of the axial deflection at the transition point.

The coupling connector is advantageously designed in such a way that at least one impact surface, and preferably two impact surfaces, of the plug lock strike(s) against at least one stop surface or a respective stop surface of the coupling body in the disengaged position, so that preferably the at least one impact surface and the at least one stop surface define or help define the disengaged position of the plug lock. The at least one impact surface is preferably formed by a bottom-side surface of the at least one terminal element. The at least one stop surface is advantageously formed by a cover-side surface of the at least one projection.

The retainer preferably comprises two arms. It is expedient that the retainer have a holding section. The holding section is preferably formed by a cover-side section of the retainer. In a side view, the retainer is expediently at least sectionally arranged axially outward relative to the verifier in a side view.

The plug lock or the retainer or at least one of the two arms preferably comprises a latching element for latching into the coupling body, wherein the at least one latching element preferably interacts with a complementary latching part of the coupling body, so that the plug lock is held or latched in the coupling body in the disengaged position. The at least one latching element and the at least one latching part preferably prevent a radial movement of the plug lock in the direction of the cover of the coupling body.

The coupling connector is advantageously designed in such a way that the disengaged position and/or the engaged position of the plug lock can be verified with the naked eye and/or by means of a machine-readable symbol and/or by means of an electronic transmitter. The plug lock advantageously comprises a cutout for verifying the engaged position of the plug lock with the naked eye. It is preferred that the coupling body comprise a wall opening for verifying the engaged position of the plug lock with the naked eye. The wall opening of the coupling body and a cutout of the plug lock especially preferably correspond, wherein the wall opening corresponds more strongly with the cutout in the engaged position by comparison to the disengaged position. It is preferred that a flange or the flange of the coupling plug abut against the first body end of the coupling body or against the coupling body if the coupling plug has been completely inserted into the coupling connector. In particular, the machine-readable symbol can be a barcode or a QR code. One example for the electronic transmitter is an RFID transmitter, which ascertains a change in position of the verifier or the plug lock. The change in position can comprise the transfer from the disengaged position into the engaged position of the plug lock and/or the transfer from the engaged position into the disengaged position.

The object mentioned at the outset is preferably achieved by a partially automatic fluid coupling, comprising a coupling connector, in particular a coupling connector according to the disclosure, and a coupling plug, wherein the coupling plug has a locking element for locking the coupling connector.

The object mentioned at the outset is advantageously achieved by using the coupling connector or the fluid coupling in a land vehicle, in particular in a road vehicle. In the case of the road vehicle, preferably a passenger car or a truck is involved. It is especially preferred that the coupling connector be used in a passenger car, and in particular in an electric vehicle. The coupling connector is further preferably a component of a cooling circuit for a battery of the electric vehicle.

BRIEF DESCRIPTION OF THE DRAWINGS

The disclosure will be described below based upon an exemplary embodiment with the help of several schematic figures. Shown on:

FIG. 1 is a perspective view of a fluid coupling according to the disclosure, comprising a coupling connector according to the disclosure as well as a coupling plug.

DETAILED DESCRIPTION

Figure 2A:
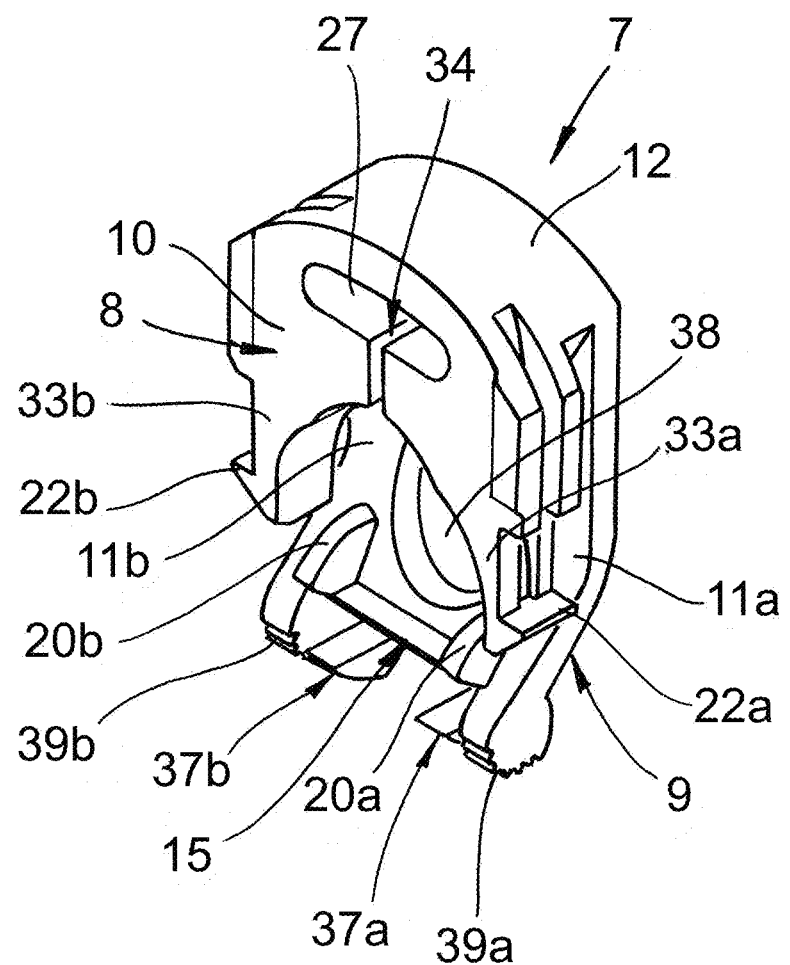
FIG. 2A is a first perspective view of a plug lock of the coupling connector on FIG. 1.

FIG. 1 shows a fluid coupling 1, 3 comprising a coupling connector 1 as well as a coupling plug 3. The coupling plug 3 can have a terminal section 28, which is designed to be hooked up to a pipe or some other component. For example, the other component can involve pumps, nozzles, tanks, and the like. In the case of the other component, the terminal section 28 of the coupling plug 3 is preferably integrally or materially connected with the other component. In the case of hooking up a pipe, the terminal section 28 can have ribs arranged around its circumference, e.g., according to FIG. 1, for insertion into the pipe. In other exemplary embodiments not shown here, the terminal section 28 can be designed as a pipe receptacle, so that the pipe can be inserted into the terminal section 28, and for example be connected with the coupling plug 3 by means of welding, in particular laser welding. The coupling plug 3 can comprise a flange 29, which strikes against the coupling connector 1 in a completely inserted state of the coupling plug 3 in the coupling connector 1.

Figure 3A:
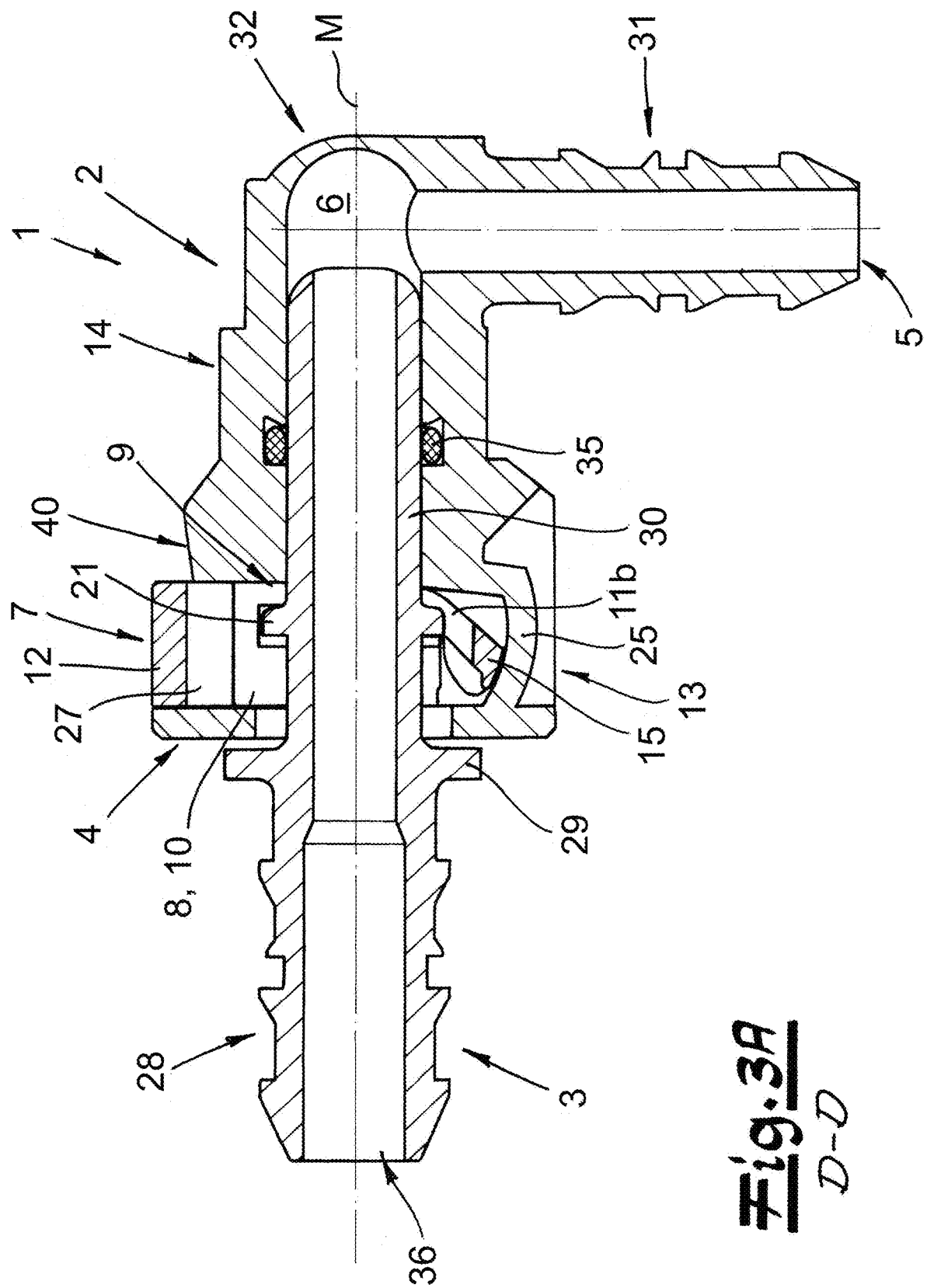
FIG. 3A is a first longitudinal section through the fluid coupling on FIG. 1.

FIG. 3A shows a longitudinal section of the coupling plug 3. In this exemplary embodiment, the coupling plug 3 is shown in a completely rotationally symmetrical manner, with the exception of the flange 29. The coupling plug 3 comprises a locking element 21, which can be designed as a circumferential collar. In exemplary embodiments not depicted here, however, the locking element can also be designed as a circumferential groove. The flange 29 and the locking element 21 can together define an intermediate section of the coupling plug 3. The coupling plug 3 expediently comprises a coupling section 30 that can be inserted into the coupling body 2. The locking process between the coupling plug 3 and coupling connector 1 will be discussed in more detail below. The terminal section 28 and the coupling section 30 of the coupling plug 3 are expediently fluidically connected with each other via a flow channel 36 of the coupling plug 3.

According to FIG. 1, the coupling connector 1 comprises a coupling body 2, which in this exemplary embodiment is designed as one piece, and preferably integrally, via injection molding. The coupling body 2 extends from a first body end 4 toward a second body end 5, wherein the first body end 4 is allocated to the coupling plug 3. The coupling body 2 preferably comprises a plug section 14, which receives the coupling plug 3. The coupling body 2 advantageously has a connecting section 31, for example which can be connected or is connected with another pipe not shown here, or with another aggregate not shown here. In the case of the coupling connector 1, the aggregate that can be connected or is connected with the coupling connector 1 can be a pump, nozzle, tank, or the like. The connecting section 31 can be connected with the aggregate reversibly, for example via press fit, or irreversibly, for example via welding or injection molding.

It is preferred that the connecting section 31 be equipped for connection with an additional pipe not shown here. The connecting section 31 can be designed for insertion into or plugging onto the additional pipe, analogously to the coupling plug 3. In this exemplary embodiment illustrated on FIG. 1, the connecting section 31 of the coupling connector 1 is provided with circumferential outer ribs, which ensure a secure fit of an additional pipe not shown here on the connecting section 31.

The coupling connector 1 in this exemplary embodiment can have a transition section 32 between the connecting section 31 and the plug section 14. As illustrated on FIG. 1, the coupling connector 1 can be angled in design, so that the connecting section 31 and the plug section 14 are angled relative to each other by 90°. It is possible for the transition section 32 to be a or the angled section of the coupling connector 1. In another embodiment not shown here, the coupling connector 1 is not angled, so that the plug section 14 and the connecting section 31 include no angle between themselves, and the transition section can be omitted.

As evident on FIG. 3A, a fluid channel 6 extends from the first body end 4 to the second body end 5. Due to the cylindrical surface of the coupling section 30 of the coupling plug 3, the plug section 14 of the coupling connector 1 has a corresponding, hollow cylindrical inner wall. The hollow cylindrical inner wall of the plug section 14 defines a middle axis M, and hence an axial, a radial, as well as a circumferential direction of the plug section 14 of the coupling connector 1. Because the coupling connector 1 is angled, the middle axis M is not identical to a longitudinal axis of the connecting section 31. The following directional indications relating to the respective axes are expediently always related to the corresponding section of the coupling connector 1.

In addition to the coupling body 2, the coupling connector according to FIG. 1 comprises a plug lock 7. The plug lock 7 and the coupling connector 1 are preferably designed in such a way that the plug lock 7 on FIG. 1 can be inserted from above, and hence in a radial direction or insertion direction, into the coupling connector 1 in a side view. The plug lock 7 can advantageously assume an engaged position inside of the coupling connector 1, as evident on FIG. 1. The plug lock 7 can especially preferably assume a disengaged position in the coupling connector 1, see FIGS. 3C and 4C. It is preferred that the plug lock 7 can be transferred by a manual pressure from a position completely outside of the coupling body 2 into the disengaged position. In the disengaged position, the plug lock 7 is advantageously latched in the coupling connector 1 or assumes a defined position there. According to the disclosure, the coupling connector 1 and the plug lock 7 are designed in such a way that, if the coupling plug 3 has been completely inserted into the coupling connector 1, the plug lock 7 is automatically transferred from the disengaged position according to FIGS. 3C and 4C into the engaged position according to FIGS. 1, 3A, 3B, 4A and 4B.

According to the disclosure, the plug lock 7 on FIG. 1 comprises a back 12, with which the plug lock 7 is brought into the disengaged position from outside of the coupling connector 1, preferably by a manual pressure. In the engaged state, the back 12 is expediently allocated to a cover 40 of the coupling body 2. The back 12 of the plug lock 7 is advantageously designed in such a way as to at least sectionally align with a surface of the coupling body 2. This enables a first visual inspection to verify a complete coupling between the coupling connector 1 and coupling plug 3. A second visual inspection is permitted by the flange 29, which in this exemplary embodiment indicates that the coupling plug 3 has been completely inserted when it strikes against the coupling connector 1. The coupling body 2 preferably comprises at least one wall opening 26, and preferably two wall openings 26. The wall openings 26 allow a third visual inspection to verify the complete insertion of the coupling plug 3 or the plug lock 7.

As evident from FIG. 2A, the plug lock 7 has a retainer 8 as well as a verifier 9, wherein the plug lock 7 is preferably manufactured as one piece, especially preferably integrally, via injection molding. The retainer 8 expediently has a holding section 10, which in this exemplary embodiment engages behind the locking element 21 of the coupling plug 3 in the completely inserted state in the coupling connector 1, and thereby secures the coupling plug 3 in the coupling connector 1. The retainer 8 in this exemplary embodiment comprises two arms 33a, 33b, wherein a respective latching element 22a or 22b of the coupling body 2 is allocated to each of the two arms 33a, 33b. In this exemplary embodiment, the latching elements 22a, 22b latch with corresponding latching parts 23a or 23b (see FIG. 4C) of the coupling body 2, and thereby secure the plug lock 7 in the disengaged position in the coupling connector 1.

According to FIG. 2A, the verifier 9 comprises two legs 11a, 11b, wherein the legs 11a and 11b extend from the back 12 downwardly or in a radial direction or in the insertion direction. The legs 11a and 11b are expediently arranged axially further inward in a section near the back by comparison to the arms 33a, 33b; see FIG. 3A. The legs 11a and 11b advantageously form a gap between themselves and the respective accompanying arm 33a or 33b in an axial direction, which can receive the locking element 21 of the coupling plug 3 in the completely inserted state in the coupling connector 1. In the engaged state of the plug lock 7, the ends of the legs 11a, 11b facing away from the back 12 are arranged on a bottom 13 (see FIG. 1) of the coupling connector 1. The bottom-side ends of the legs 11a, 11b preferably have impact surfaces 16a or 16b. Each of the two legs 11a, 11b advantageously comprises a contact ramp 20a or 20b for contacting the locking element 21 of the coupling plug 3.

The two legs 11a and 11b are especially preferably connected with each other via a connecting web 15. The connecting web 15 in this exemplary embodiment is advantageously arranged between the two contact ramps 20a or 20b. As a result of the connecting web 15 of the verifier 9, the two legs 11a and 11b are rigidly designed in relation to each other, and in particular cannot be spread apart. By contrast, the retainer 8 is preferably spreadable in design, in particular so as to ensure the latching function by means of the latching elements 22a, 22b. The plug lock 7 or the retainer 8 advantageously has a gap 34 for this purpose.

Figure 2B:
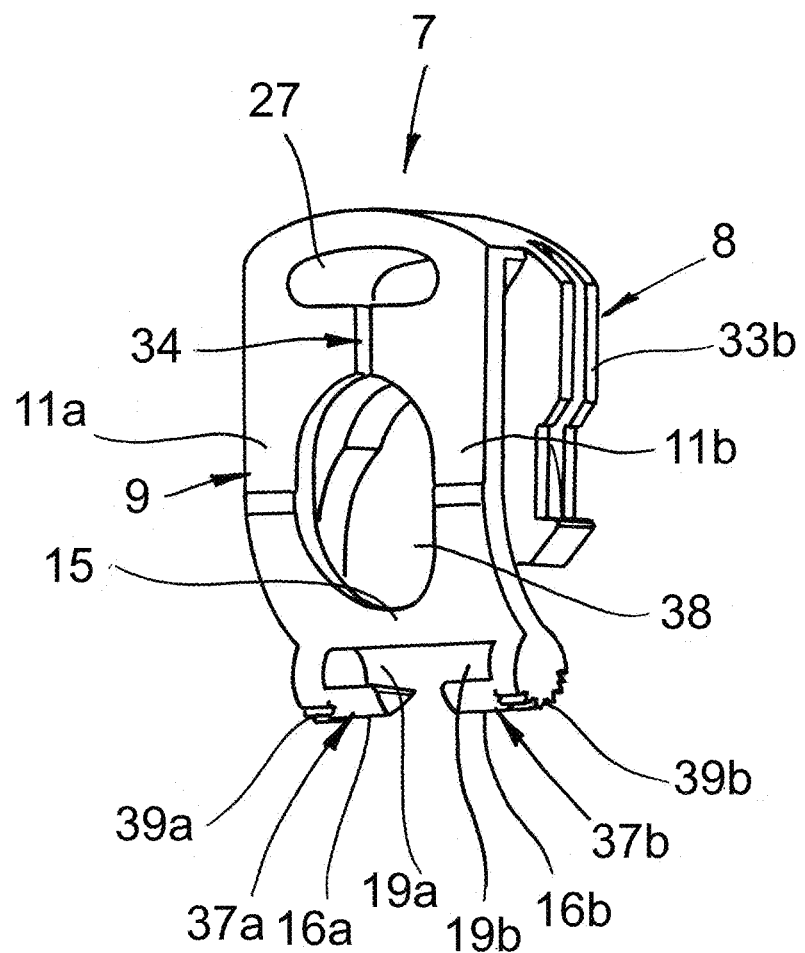
FIG. 2B is a second perspective view of a plug lock of the coupling connector on FIG. 2A.

As evident on FIG. 2B, the legs 11a and 11b preferably define receptacles 19a or 19b with the connecting web 15 and the impact surfaces 16a and 16b. The plug lock 7 preferably comprises a cutout 27. The cutout 27 in this exemplary embodiment corresponds with the wall openings 26 on FIG. 1. The verifier 9 expediently comprises a plug opening 38 for receiving the coupling plug 3, and in a front view is preferably longer in the insertion direction than in the direction orthogonal thereto. It is preferred that the gap 34 connect the plug opening 38 with the diameter 27, so as to ensure a smooth blocking of the arms 33a, 33b. Each of the legs 11a, 11b preferably comprises a terminal element 37a, 37b at a bottom-side end. The bottom-side ends of the terminal elements 37a, 37b advantageously each have an actuating element 39a, 39b. The actuating elements 39a, 39b preferably each comprise a rough or fluted structure for purposes of manual operation.

FIG. 3A shows the fluid coupling 1, 3 on FIG. 1 in a longitudinal section through the middle axis M, wherein the plug lock 7 is in an engaged state, while and because the coupling plug 3 is completely inserted into the coupling connector 1. This can be discerned in particular from the fact that an upper section of the locking element 21 of the coupling plug 3 is arranged between the retainer 8 and the verifier 9. Because the position is defined in this way, the coupling section 30 of the coupling plug 3 expediently corresponds with a seal 35 of the coupling connector 1. The seal 35 in this initial example comprises a sealing ring.

It is preferred that the coupling body 2 comprise a web 25. The web 25 is advantageously arranged on the bottom 13 of the plug section 14 of the coupling body 2. As evident on FIG. 3A, the connecting web 15 of the verifier 9 advantageously strikes against the web 25 in the engaged state of the plug lock 7. The retainer 8 and/or the verifier 9 preferably abut against a back-side section of the coupling plug 3 in the engaged position of the plug lock 7. The longitudinal extension of the web 25 preferably extends in predominantly an axial direction. The web 25 advantageously borders the bottom openings 24a, 24b or subdivides the bottom openings 24a, 24b.

Figure 3B:
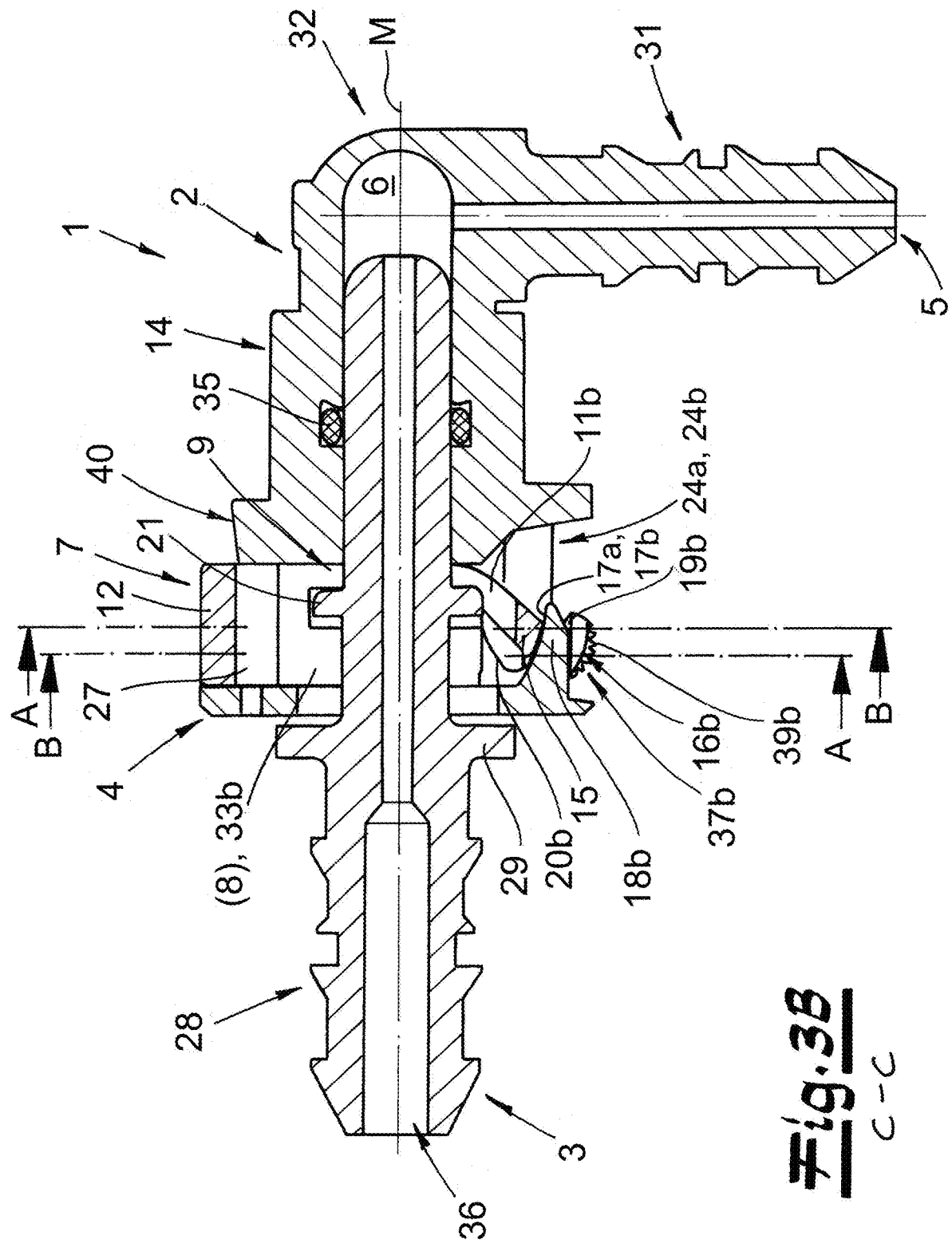
FIG. 3B is a second longitudinal section through the fluid coupling on FIG. 1 with the plug lock in an engaged position.

On FIG. 3B, the longitudinal section was selected in such a way as to run parallel to those on FIG. 3A and through the legs 11b. The wall opening 26 of the coupling body 2 advantageously corresponds with the cutout 27 of the plug lock 7 when the plug lock 7 is in the engaged position. This enables a (third) visual inspection of the engaged states of the plug lock 7 or the complete introduction of the coupling plug 3. The coupling connector 1 especially preferably comprises at least one, and especially preferably two projections 18a, 18b. The longitudinal section on FIG. 3B runs through the projection 18b, as well as through the connecting web 15 and the impact surface 16b. It is very preferred that at least one of the two legs 11a, 11b, and preferably both legs 11a, 11b, have a receptacle 19a or 19b. The projection 18b of the coupling body 2 preferably engages into the receptacle 19b in an engaged state, and expediently defines the engaged state of the plug lock 7.

The bottom 13 of the coupling body 2 preferably comprises at least one, and preferably two bottom openings 24a, 24b. The bottom opening 24b is expediently allocated to the projection 18b or the leg 11b. The at least one bottom opening 24a, 24b or the bottom openings 24a and 24b make it possible to transfer the plug lock 7 from the disengaged into the engaged state. While the impact surface 16b of the plug lock 7 advantageously abuts against a surface of the projection 18b facing the back 12 in the disengaged state, the projection 18b of the coupling body is located in the receptacle 19b of the leg 11b after the plug lock 7 has been transferred into the engaged position. The coupling connector preferably comprises an electronic transmitter not illustrated here, in particular an RFID transmitter. It is preferred that the electronic transmitter acquire the transfer from the engaged into the disengaged position, and advantageously also vice versa, and that the transfer acquired in this way be detectable with a reader.

Figure 3C:
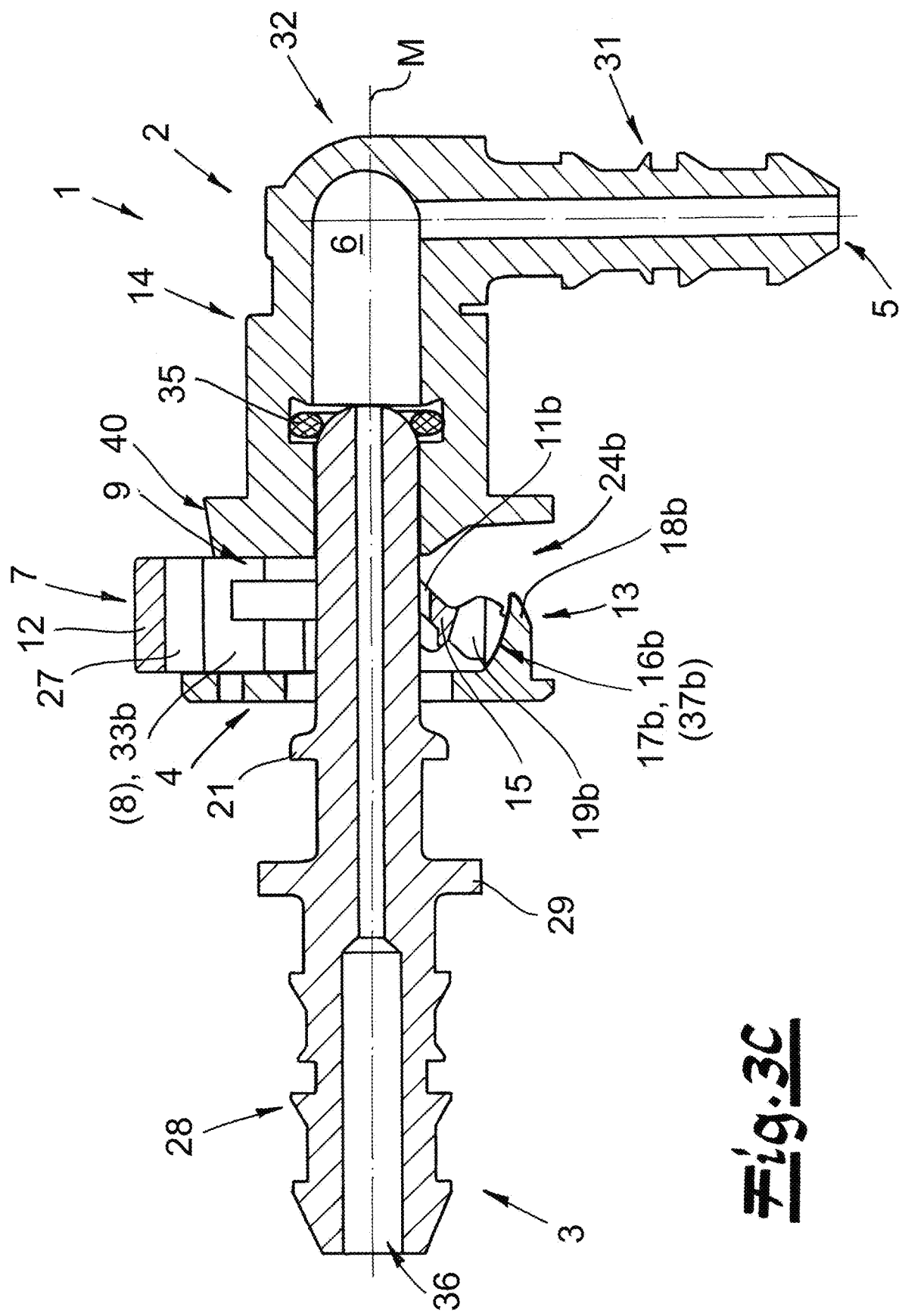
FIG. 3C is the longitudinal section of FIG. 3B, wherein the plug lock is in a disengaged position.

On FIG. 3C, the plug lock 7 is—still—in the disengaged state, while the coupling plug 3 has already been partially inserted. As can be discerned in particular, the locking element 21 of the coupling plug 3 has not yet reached the intermediate space between the retainer 8 and the verifier 9. Just as the coupling section 30 of the coupling plug 3 has not reached the seal 35. As a consequence, neither a mechanical protection nor a fluidic seal is present in the state of the fluid coupling 1, 3 shown on FIG. 3C. It is preferred that the plug lock 7 abut or strike against the at least one projection 18a, 18b or the at least one stop surface 17a, 17b with the at least one terminal element 37a, 37b or with the at least one impact surface 16a, 16b. As a result, the plug lock 7 cannot mistakenly be transferred into the engaged position while still in the disengaged position by manually pressing on the back 12.

In order to transfer the plug lock 7 from the disengaged position according to FIG. 3C into the engaged position according to FIG. 3B, the coupling plug 3 must preferably be completely introduced into the coupling connector 1. During the introduction of the coupling plug 3, the locking element 21 preferably touches the at least one contact ramp 20a, 20b, as a result of which the legs 11a, 11b are elastically deflected axially inward. This deflection builds up an elastic, mechanical stress in the plug lock 7 or in the verifier 9, until the terminal elements 37a, 37b reach the bottom openings 24a, 24b. As soon as a sufficient axial deflection of the legs 11a, 11b has been reached, an axially outward tip of the terminal element 37b and an axially inward tip of the projection 18b no longer touch each other. This moment or point can be referred to as the transition moment or transition point. In the transition moment of the preferably complete insertion of the coupling plug 3, the spring-elastic energy stored in the verifier 9 or in the legs 11a, 11b is released, so that the plug lock 7 is automatically and abruptly pulled from the disengaged position into the engaged position, and the state illustrated on FIG. 3B is reached. After this abrupt latching movement has ended, the plug lock 7 is located in the engaged position according to FIG. 3B, so that the projections 18a, 18b are located in the respective receptacles 19a, 19b of the verifier 9.

It is preferred that the engaged position of the plug lock 7 according to FIG. 3B can be transferred into the disengaged position through manual operation. For this purpose, the user expediently presses the two terminal elements 37a, 37b or the actuating elements 39a, 39b with the preferably rough/fluted structure in an axially inward direction, so that a mechanical-elastic stress is built up. As soon as the terminal elements 37a, 37b have reached the bottom openings 24a, 24b, the mechanical stress is discharged via the reset force, so that the plug lock 7 jumps into the disengaged position according to FIG. 3C, 4C. As a result, the coupling plug 3 is preferably transferred from the completely inserted position (not illustrated in conjunction with the disengaged position of the plug lock 7) into a nearly completely inserted position (also not illustrated), and only has to be pulled out of the coupling connector 1.

Figure 4A:
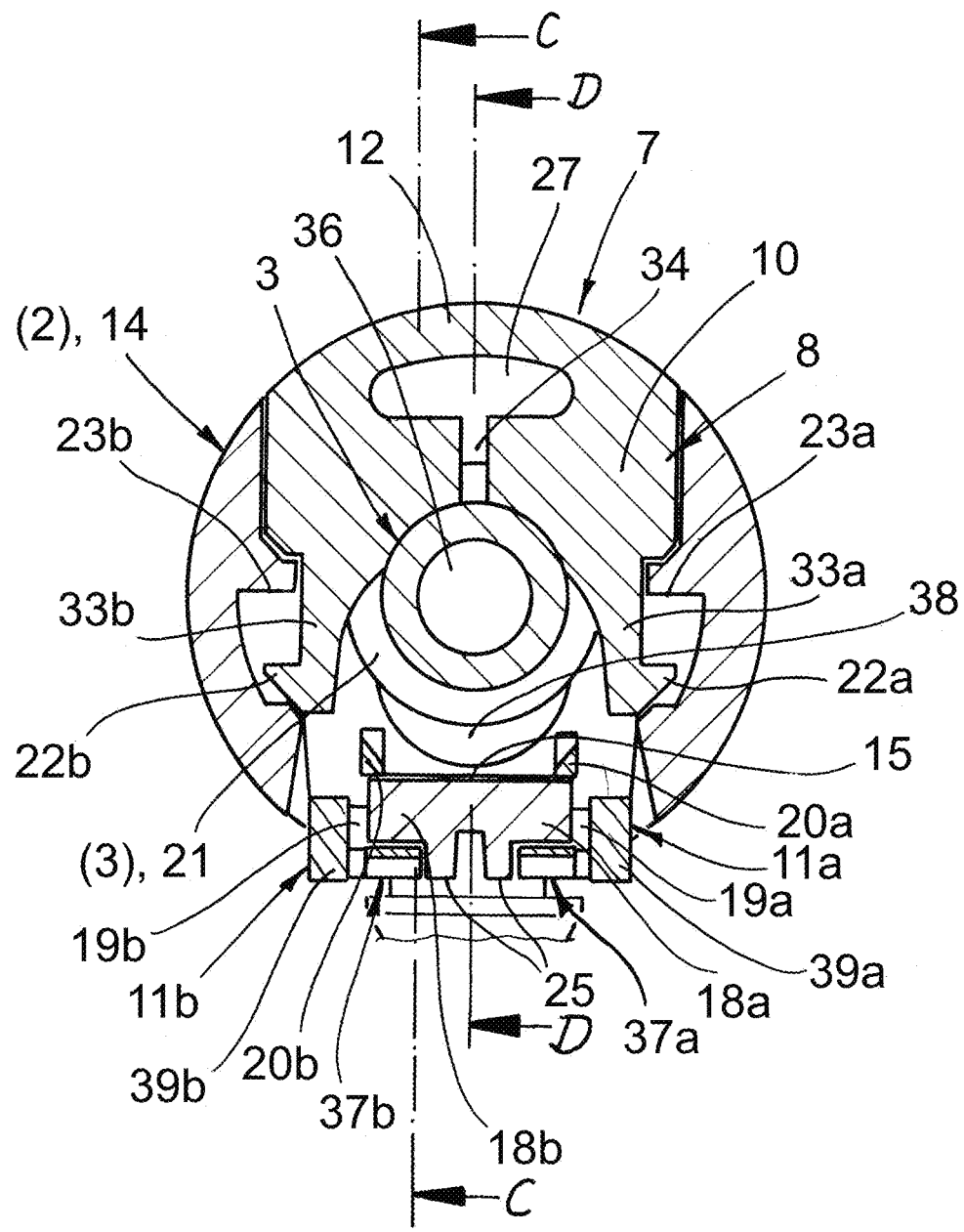
FIG. 4A is a first cross section through the fluid coupling on FIG. 1 with the plug lock in an engaged position.

FIG. 4A illustrates a cross section that is denoted on FIG. 3B by the dot-dashed line. Conversely, the longitudinal sections of FIGS. 3A and 3B are symbolized by dot-dashed lines on FIG. 4A.

In particular, the cross section on FIG. 4A runs through the two arms 33a, 33b of the retainer 8, and thus also through the intermediate section 36 of the coupling plug 3, as well as through the plug section 14 of the coupling body 2. At the location of the cross section on FIG. 4A, the projections 18a, 18b have a rather large radial expansion in the insertion direction of the plug lock 7. Conversely, the radial expansion of the terminal elements 37a, 37b is relatively small, see FIG. 3B. As evident on FIG. 4A, the contact ramps 20a, 20b are preferably beveled to achieve a better force transmission from the locking element 21 to the respective contact ramp 20a, 20b. This is because a bottom-side area of the locking element 21 shown on FIG. 4A strikes against the two contact ramps 20a, 20b during insertion of the coupling plug 3, which causes the deflection of the verifier 9 or the leg 11a, 11b to begin.

Figure 4B:
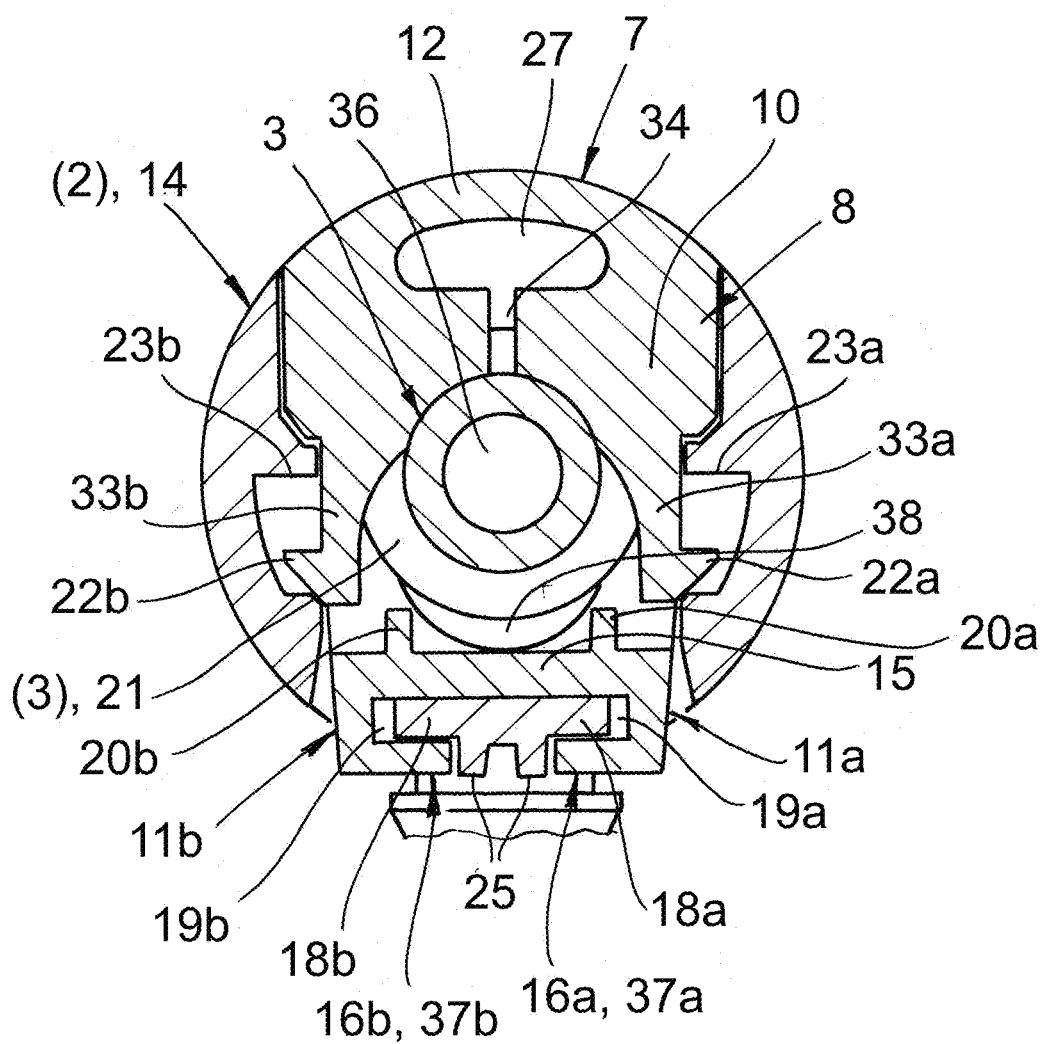
FIG. 4B is a second cross section through the fluid coupling on FIG. 1 with the plug lock in an engaged position.

FIG. 4B illustrates the cross section as denoted with the corresponding dot-dashed line on FIG. 3B. The connecting web 15 of the verifier, preferably together with the terminal elements 37a, 37b, preferably positively encloses the projections 18a, 18b of the coupling body 2. The receptacles 19a, 19b of the verifier 9 preferably rest on the projections 18a, 18b, which ensures an advantageous, secure fit of the plug lock 7 in the coupling body 2.

Figure 4C:
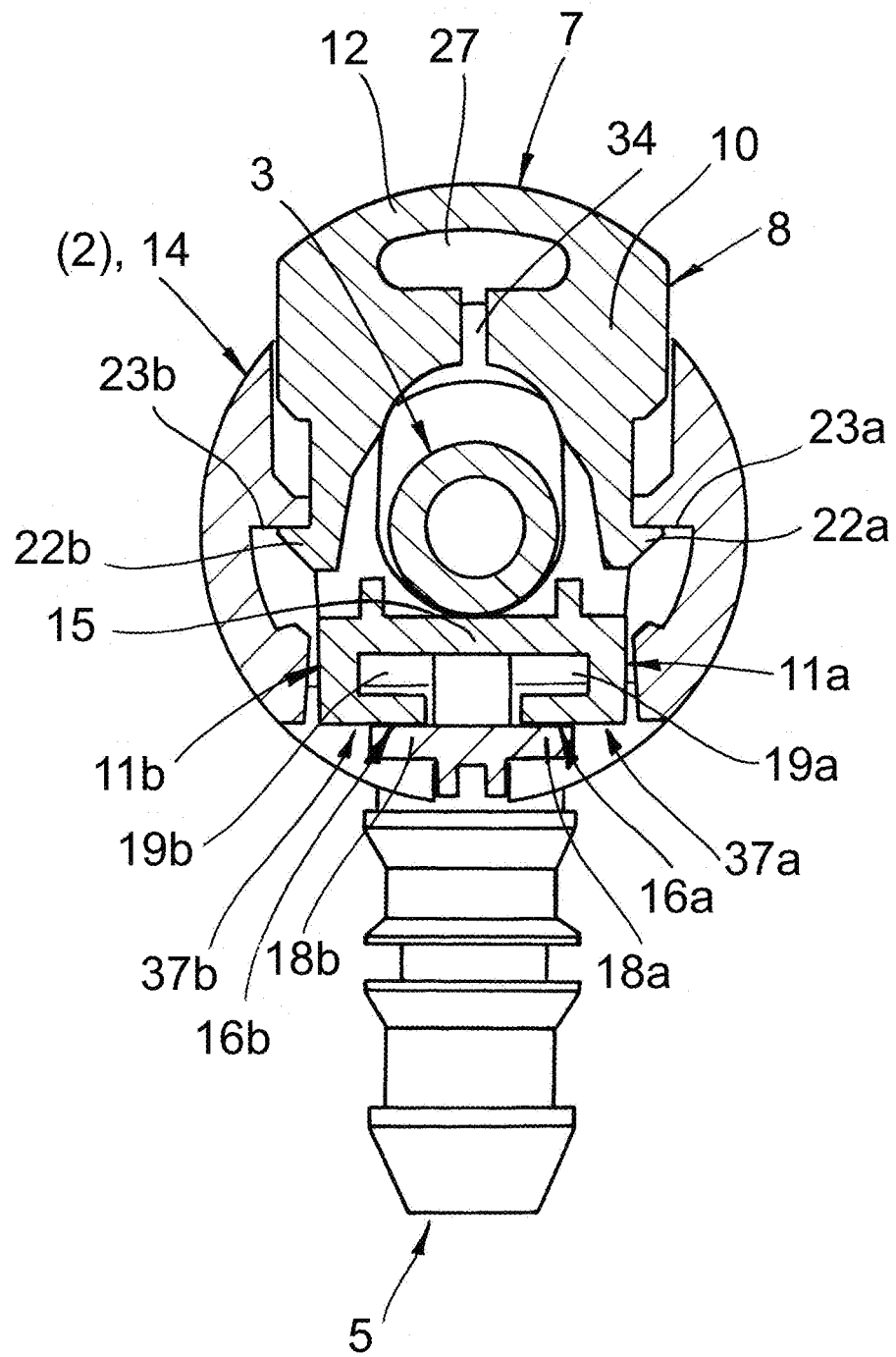
FIG. 4C is the cross section on FIG. 4B, wherein the plug lock is in the disengaged position according to FIG. 3C.

FIG. 4C illustrates the disengaged position of the plug lock 7 in cross section. In the disengaged position, the arms 33a, 33b of the plug lock 7 or of the retainer 8 are preferably latched via the latching elements 22a, 22b with latching parts 23a, 23b, preferably in the form of shoulders, of the coupling body 2, so that the plug lock 7 is securely held in the coupling body 2. It is preferred that the terminal elements 37a, 37b or their impact surfaces 16a, 16b simultaneously strike against the stop surfaces 17a, 17b of the projections 18a, 18b of the coupling body 2. The latching on the one hand and the striking on the other advantageously ensures that the plug lock 7 cannot move in the insertion direction in the disengaged position until the locking element 21 of the coupling plug 3 has reached the verifier 9. This conveys a high-quality impression of the coupling connector 1.

As a whole, the arrangement comprising the bottom-side portion of the coupling body 2 as well as the bottom-side end of the verifier 9 provides for a very stable and durable latching device, which automatically pulls in the plug lock 7 given the complete insertion of the coupling plug 3 into the coupling body 2. As a result, this mechanism is more robust than the mechanism already known in prior art for detecting the state of complete insertion of the coupling plug, as well as the mechanism for automatically pulling in the plug lock 7.

In addition, the plug lock 7 is preferably returned from the engaged into the disengaged position via an axially inward pressure to be manually exerted on the preferably rough/fluted actuating elements 39a, 39b. This also makes releasing the fluid coupling 1, 3 very user friendly. This resulted in the creation of a completely novel coupling connector 1 or fluid coupling 1, 3 with an outstanding robustness and user friendliness.

| REFERENCE LIST | |
|---|---|
| 1 | Coupling connector |
| 2 | Coupling body |
| 3 | Coupling plug |
| 4 | First body end of 2 |
| 5 | Second body end of 2 |
| 6 | Fluid channel of 2 |
| 7 | Plug lock |
| 8 | Retainer |
| 9 | Verifier |
| 10 | Holding section of 8 |
| 11a, 11b | Leg of 9 |
| 12 | Back of 7, 9 |
| 13 | Bottom of 2 |
| 14 | Plug section of 2 |
| 15 | Connecting web of 9 |
| 16a, 16b | Impact surface of 7, 9 |
| 17a, 17b | Stop surface of 2 |
| 18a, 18b | Projection of 2 |
| 19a, 19b | Receptacle of 7, 9 for 18 |
| 20a, 20b | Contact ramp of 9 |
| 21 | Locking element of 3 |
| 22a, 22b | Latching element of 7 |
| 23a, 23b | Latching part of 2 for 22 |
| 24a, 24b | Bottom opening of 2 for 11a, 11b |
| 25 | Web of 24 |
| 26 | Wall opening of 2 for 27 |
| 27 | Cutout of 7 |
| 28 | Terminal section of 3 |
| 29 | Flange of 3 |
| 30 | Coupling section of 3 |
| M | Middle axis of 14 |
| 31 | Connecting section of 2 |
| 32 | Transition section of 2 |

-continued

REFERENCE LIST

| 33a, 33b | Arm of 8 |
| 34 | Gap of 7 |
| 35 | Seal |
| 36 | Flow channel of 3 |
| 37a, 37b | Terminal element |
| 38 | Plug opening of 9 |
| 39a, 39b | Actuating element |
| 40 | Cover |

The invention claimed is:

1. A coupling connector for a partially automatic fluid coupling, wherein the coupling connector has a coupling body, wherein the coupling connector is designed to enter into a detachable latching connection with a coupling plug that can be inserted into the coupling connector, wherein the coupling connector comprises a plug lock, wherein the plug lock has a retainer and a verifier, wherein a holding section of the retainer is designed to lock the coupling plug in the coupling body,
wherein the plug lock is arranged in a plug section of the coupling body, wherein the plug section has a middle axis, wherein the plug lock can be inserted into the coupling body in a radial direction in a side view, wherein the coupling connector is configured such that the plug lock can assume a radially disengaged position and a radially engaged position relative to the coupling body, wherein the coupling connector is configured such that the coupling plug is secured by the retainer in the coupling body in an axial direction in the engaged position of the plug lock,
wherein the verifier has two legs and a back, wherein a bottom of the coupling body is allocated to ends of the legs facing away from the back, wherein the verifier is designed to react to a contact of the coupling plug during an insertion of the coupling plug, so that the plug lock is automatically transferred from the disengaged position into the engaged position by a deflection of the verifier, wherein the coupling connector is configured such that the verifier or the legs are axially deflected in the axial direction by an insertion movement of the coupling plug, wherein the verifier comprises a connecting web, wherein the connecting web is arranged opposite the back in relation to the middle axis during the disengaged and/or the engaged position, and connects the legs with each other, and
wherein the coupling connector is configured such that bottom-side ends of the legs retain their distance from each other while being deflected by the coupling plug.

2. A coupling connector for a partially automatic fluid coupling, wherein the coupling connector has a coupling body, wherein the coupling connector is designed to enter into a detachable latching connection with a coupling plug that can be inserted into the coupling connector, wherein the coupling connector comprises a plug lock, wherein the plug lock has a retainer and a verifier, wherein a holding section of the retainer is designed to lock the coupling plug in the coupling body,
wherein the plug lock is arranged in a plug section of the coupling body, wherein the plug section has a middle axis, wherein the plug lock can be inserted into the coupling body in a radial direction in a side view, wherein the coupling connector is configured such that the plug lock can assume a radially disengaged position and a radially engaged position relative to the coupling body, wherein the coupling connector is configured such that the coupling plug is secured by the retainer in the coupling body in an axial direction in the engaged position of the plug lock,
wherein the verifier has two legs and a back, wherein a bottom of the coupling body is allocated to ends of the legs facing away from the back, wherein the verifier is designed to react to a contact of the coupling plug during an insertion of the coupling plug, so that the plug lock is automatically transferred from the disengaged position into the engaged position by a deflection of the verifier, wherein the coupling connector is configured such that the verifier or the legs are axially deflected in the axial direction by an insertion movement of the coupling plug,
wherein the coupling body has at least one projection that extends axially inward, wherein the at least one projection protrudes through the verifier or through one of the legs at least partially in the axially direction in the side view in the engaged position of the plug lock, and
wherein the coupling connector is configured such that bottom-side ends of the legs retain their distance from each other while being deflected by the coupling plug.

3. The coupling connector according to claim 1, wherein the coupling connector is designed such that the plug lock can be transferred from the engaged into the disengaged position when actuating a bottom-side section of the verifier in an axially inward direction.

4. The coupling connector according to claim 1, wherein a bottom-side end of the plug lock or of the verifier comprises at least one actuating element for transferring the plug lock from the engaged position into the disengaged position.

5. The coupling connector according to claim 1, wherein the legs of the verifier are angled or bent axially outward in the side view and following the insertion direction of the plug lock.

6. The coupling connector according to claim 1, wherein the plug lock or the verifier comprises at least one receptacle in a front view, wherein the at least one receptacle is configured to be latched with an element of the coupling body.

7. The coupling connector according to claim 1, wherein the bottom of the coupling body has at least one bottom opening, wherein the coupling connector is configured such that the legs glide at least sectionally through the at least one bottom opening in the side view during the transition from the disengaged into the engaged position.

8. The coupling connector according to claim 1, wherein a section of the verifier or one or more of the legs is located in a radial direction between the bottom and the retainer or the holding section in the side view in the disengaged position.

9. The coupling connector according to claim 1, wherein the verifier has a contact surface for contacting the coupling plug, wherein the coupling connector or the plug lock or the verifier is configured such that the contact surface is arranged opposite the back of the verifier while the plug lock is in an engaged position in relation to the middle axis of the plug section.

10. The coupling connector according to claim 1, wherein the coupling connector is configured such that at least one impact surface of the plug lock strikes against at least one stop surface of the coupling body in the disengaged position, so that the at least one impact surface and the at least one stop surface define the disengaged position of the plug lock.

11. The coupling connector according to claim 1, wherein the plug lock or the retainer has at least one latching element for latching into the coupling body, wherein the at least one latching element interacts with a complementary latching part of the coupling body, so that the plug lock is held or latched in the coupling body in the disengaged position.

12. The coupling connector according to claim 1, wherein the coupling connector is configured such that the disengaged position and/or the engaged position of the plug lock can be verified with the naked eye and/or by means of a machine-readable symbol and/or by means of an electronic transmitter.

13. The coupling connector according to claim 1, wherein ramps are formed on the legs of the verifier, the ramps projecting axially away from the back and sloped relative to the central axis.

14. The coupling connector according to claim 2, wherein the verifier comprises a connecting web, wherein the connecting web is arranged opposite the back in relation to the middle axis during the disengaged and/or the engaged position, and connects the legs with each other.

15. The coupling connector according to claim 2, wherein the coupling connector is designed such that the plug lock can be transferred from the engaged into the disengaged position when actuating a bottom-side section of the verifier in an axially inward direction.

16. The coupling connector according to claim 2, wherein the legs of the verifier are angled or bent axially outward in the side view and following the insertion direction of the plug lock.

17. The coupling connector according to claim 2, wherein the bottom of the coupling body has at least one bottom opening, wherein the coupling connector is configured such that the legs glide at least sectionally through the at least one bottom opening in the side view during the transition from the disengaged into the engaged position.

18. The coupling connector according to claim 2, wherein ramps are formed on the legs of the verifier, the ramps projecting axially away from the back and sloped relative to the central axis.

19. A partially automatic fluid coupling comprising a coupling connector according to claim 1, and a coupling plug, wherein the coupling plug has a locking element for locking in the coupling connector.

20. A land vehicle comprises a coupling connector according to one of claims 1 in a land vehicle.

* * * * *